United States Patent Office 3,195,930
Patented July 20, 1965

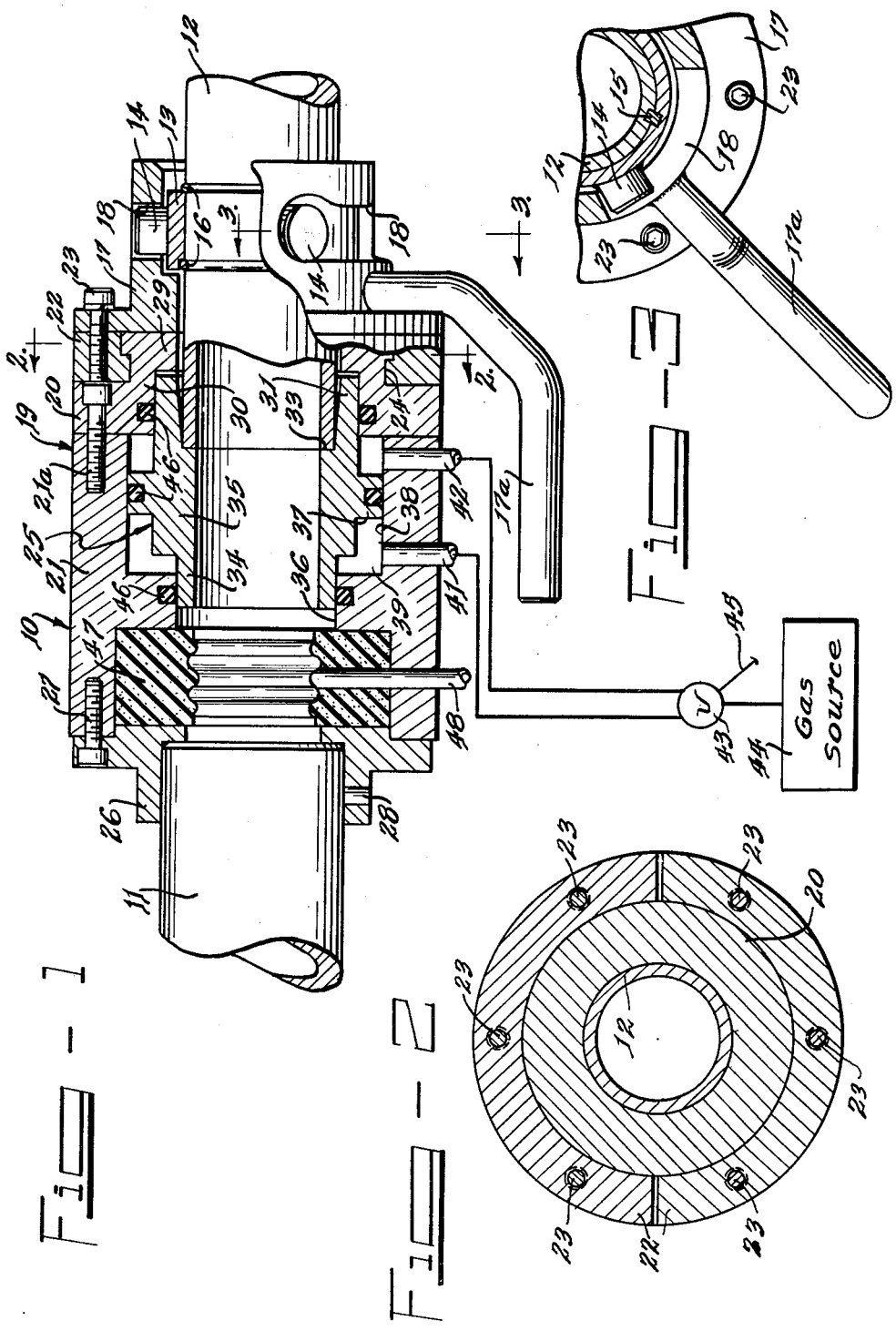

3,195,930
DEVICE FOR COUPLING A CHARGING APPARATUS TO A REACTOR NOZZLE
Robert J. Ascherl, Latina, Italy, Eugene T. Hubbard, Livermore, Calif., and David R. Resner, Kennewick, and Cecil R. Oak, Richland, Wash., assignors to the United States of America as represented by the United States Atomic Energy Commission
Filed Sept. 20, 1963, Ser. No. 310,503
3 Claims. (Cl. 285—27)

This invention relates to a coupling device for attaching a charging apparatus to a tube. More specifically, the invention relates to the coupling of a charging apparatus to a tubular nozzle connected with a process tube of a reactor adapted to receive nuclear-fuel elements from the charging apparatus.

In certain types of nuclear reactors fuel elements in the form of aluminum-jacketed cylindrical metal pieces are located in coolant tubes that are somewhat larger than the fuel elements so as to permit coolant to flow over the fuel elements and within the tubes. The charging apparatus that is to supply new fuel elements to a coolant tube must be quickly and easily attached to and detached from lugs or projections whose relative position may vary appreciably from tube to tube. At the same time, the alignment of the charging machine with the coolant tube must be good, for misalignment may cause damage to the fuel-element jacket and thus shorten the life of the fuel element in the reactor.

The coupling device of the present invention may be attached and detached quickly and assures a good alignment and tight connection of a charging machine with a reactor tube, in spite of variation in the location of attaching lugs.

In the drawing:

FIG. 1 is a longitudinal sectional view of the coupling device of the present invention, showing it applied to charging machine and the nozzle of a reactor tube;

FIG. 2 is a transverse sectional view taken on the line 2—2 of FIG. 1 showing a segmental ring construction for joining parts of the coupling device; and FIG. 3 is a fragmentary sectional view taken on the line 3—3 of FIG. 1.

As shown in FIG. 1, a coupling device 10 of the present invention connects a tubular member 11 with a nozzle 12 aligned with a coolant tube (not shown) of a nuclear reactor. Reference is made to Fermi et al. Patent 2,708,-656, dated May 17, 1955, for a disclosure of a nuclear reactor of the type to which the coupling device 10 may be applied.

As shown in FIGS. 1 and 3, the nozzle 12 is provided with a ring 13 having a plurality of outwardly extending lugs 14 peripherally spaced from one another. The ring 13 is held against movement along the nozzle 12 by a key 15 and against movement about the nozzle by snap rings 16.

The coupling device 10 includes a connector 17 which is manipulated by a handle 17a and is provided with bayonet slots 18 receiving the lugs 14 of the ring 13. The coupling device also includes a housing 19 formed in two parts 20 and 21 connected by screws 21a. As shown in FIGS. 1 and 3, the housing part 20 is attached to the connector 17 by a ring 22 formed in halves and screws 23. The parts of ring 22 engage an external groove 24 in the housing part 20, and the screws 23 go freely through the connector 17 and are threaded into the parts of ring 22.

The coupling device 10 also includes an alignment ring 25 lying within the housing 19 and a collar 26 attached by screws 27 to the housing part 21 and by screws 28 to the tubular member 11.

The connector 17 has a loose fit with the nozzle 12 as does an adjoining portion 29 of the housing part 20. The latter also has a portion 30 which surrounds the region of the nozzle adjacent its end in radially spaced relation thereto so that an annular space is formed which receives a relatively thin end portion 31 of the alignment ring 25. The end portion 31 has a cylindrical exterior fitting the portion 30 of housing part 20 and a tapering interior decreasing in diameter from its outer end to its inner end located at an internal shoulder 33 of the alignment ring 25. Thus, only the inner end of the portion 31 fits the exterior of the nozzle 12, and the end portion 31 performs an aligning function on the nozzle as the alignment ring is shifted rightward as viewed in FIG. 1 to abut the internal shoulder 33 and the end of the nozzle 12.

The rest of the alignment ring 25, which comprises a relatively thin end portion 34 and a relatively thick intermediate portion 35, has a uniform internal diameter equal to or a little less than that of the nozzle 12. The end portion 34 of the alignment ring has a cylindrical exterior fitting a region 36 of the housing part 21. The intermediate portion 35 of the alignment ring has a flange 37 provided with a cylindrical exterior fitting a region 38 of the housing part 21, so that annular chambers 39 and 40 are formed at opposite sides of the flange 37 between the alignment ring and the housing 19. Lines 41 and 42, which lead to the chambers 39 and 40, respectively, are selectively connectable through a valve 43 to a source 44 of gas under pressure and an exhaust line 45, whereby gas under pressure is used to shift the alignment ring 25 in one direction or the other. The chambers 39 and 40 are sealed by O-ring seals 46 positioned in grooves in the alignment ring 25 and the housing 19. An internally ribbed seal 47 is held between the collar 26 and the region 36 of the housing part 21 and is provided with a drain line 48.

When the reactor tube associated with nozzle 12 is to be charged with fuel elements, the charging apparatus and the coupling device, already attached to the tubular member 11 of the charging apparatus, are moved axially up to the nozzle 12. The connector 17, along with screws 23 and ring 22, will have been made rotatable with respect to the rest of the coupling device 10 by loosening of the screws. The connector 17 is attached to the lug ring 13 by being moved axially and rotatably thereon, the lugs being moved relatively into the ends of the bayonet slots 18, as shown in FIG. 1. Now the screws 23 are tightened to make the ring 22 fix the connector 17 against rotation with respect to the rest of the coupling device 10.

At this time, the alignment ring 25 will be leftward of the position shown in FIG. 1 and will loosely receive the end of the nozzle 12. Now gas under pressure is applied to the chamber 39 to move the alignment ring 32 to the right until abutting sealing contact is achieved between the internal shoulder 33 of the alignment ring 32 and the end of the nozzle 12 and the ring and nozzle are aligned with one another. Now fuel elements being fed into the reactor pass from the tubular member through the ribbed seal 47 and the alignment ring 25 into the nozzle 12 and suffer no damage, because of the alignment of these parts with one another. Alignment of the nozzle 12 with the alignment ring 25 is readily achieved, because when the coupling device 10 is first applied to the nozzle, the end region of the nozzle is already inserted in the end portion 31 of the alignment ring and the said end portion is internally tapered.

When the charging operation is over, gas under pressure is applied to the chamber 40 to shift the ring 25 to the left and thereby take the internal shoulder 33 out of contact with the end of the nozzle 12. Now the screws 23 are loosened so that the connector 17 can be rotated and freed of the ring 13.

It is understood that the invention is not to be limited by the details given herein but that it may be modified within the scope of the appended claims.

What is claimed is:

1. A device for coupling a charging machine with one end of a nozzle of a process tube of a reactor in alignment with the nozzle, said device comprising a housing connectable to a region of the tubular nozzle slightly spaced from its said one end and extending in spaced relation around the nozzle and beyond its said one end, whereby an annular space is formed between the housing and the outer surface of the nozzle directly adjacent its said one end, an alignment ring projecting around the nozzle into said annular space and fitting the housing at this region, the ring having an internal shoulder abuttable with said one end of the nozzle, the internal shoulder being spaced from the end of the ring lying within the annular space, the ring having a tapering interior decreasing in diameter from the said end to the said internal shoulder so as to fit the nozzle only at the said internal shoulder, means for shifting the alignment ring with respect to the housing to abut the shoulder of the ring with said one end of the nozzle and thereby to produce a seal between the ring and the nozzle, and means for connecting the housing to the charging machine.

2. A device as specified in claim 1 the means for shifting the alignment ring with respect to the housing operating by supplying gas under pressure to a space formed between the housing and the ring.

3. The device specified in claim 2 and further comprising pneumatic means for shifting the alignment ring with respect to the housing for moving the internal shoulder of the ring away from the nozzle end.

References Cited by the Examiner

UNITED STATES PATENTS

| 1,117,762 | 11/14 | Barcus | 285—101 |
| 1,880,853 | 10/32 | Davis | 285—361 |
| 2,593,491 | 4/52 | Saunders | 285—96 |
| 2,712,458 | 7/55 | Lipson | 285—101 |

CARL W. TOMLIN, *Primary Examiner.*